Patented Aug. 9, 1949

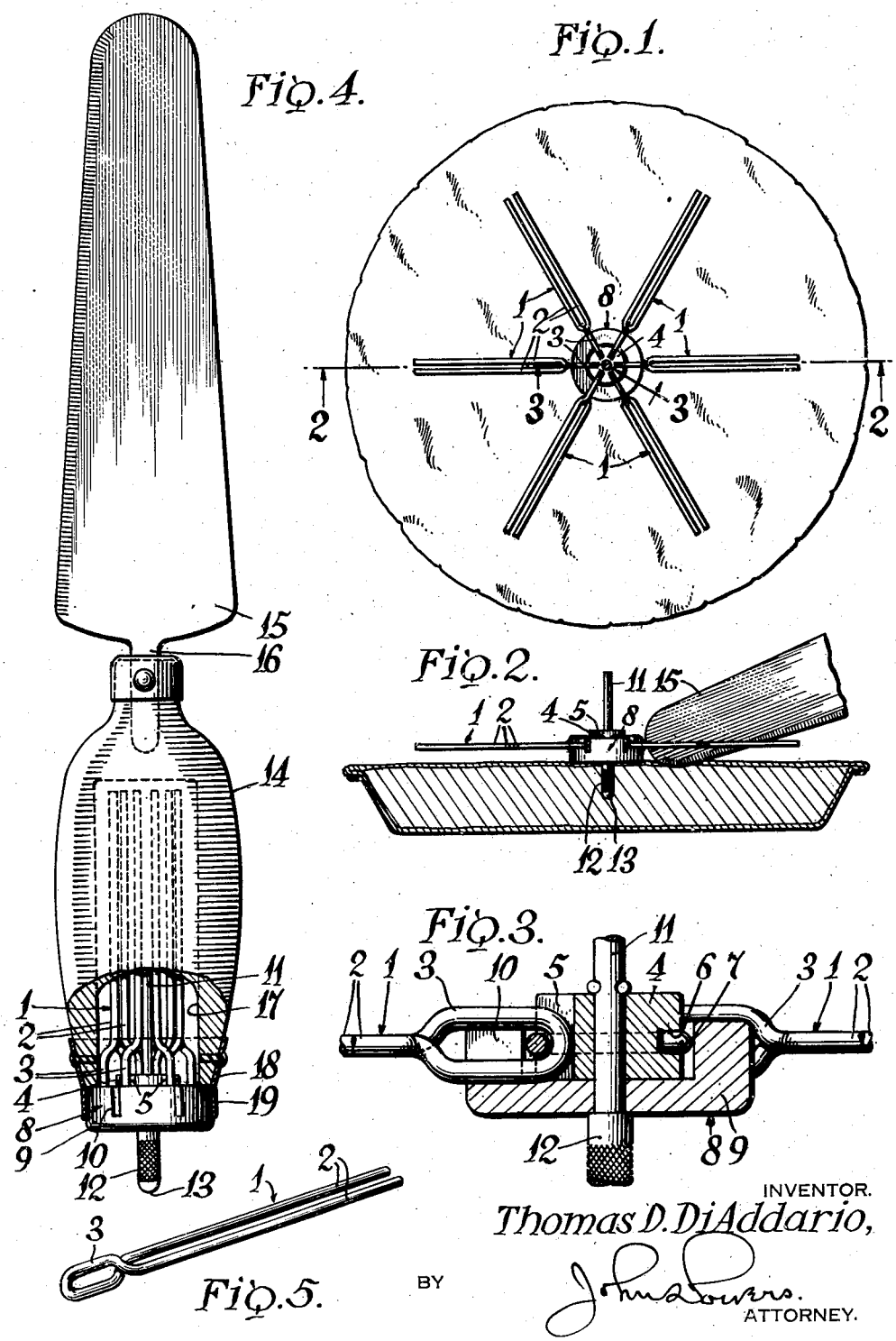

2,478,572

UNITED STATES PATENT OFFICE

2,478,572

KNIFE GUIDE FOR USE IN CUTTING PIES OR CAKES INTO SLICES

Thomas D. Di Addario, Buffalo, N. Y.

Application October 11, 1948, Serial No. 53,956

8 Claims. (Cl. 146—150)

This invention relates to a unitary knife guide for use in cutting pies or cakes into sections (slices) of equal value.

The object of the invention is to provide a knife guide combining means for centering engagement with the pie or cake to be cut, knife guiding elements having operative positions and collapsed positions and which in their operative positions are centered by said means and held free from contact with the exposed surface of the pie or cake, a carrying element for the knife guiding elements and a receptacle cooperative with the carrying element and in relation to which the carrying element is insertable or detachable, the receptacle being so formed and the carrying element and the knife guiding elements being so organized that the knife guiding elements, as collapsed, may normally be stored within the receptacle and, when the carrying element is detached from the receptacle, will automatically assume the positions required for their use, the receptacle being thereupon available for use as the handle of the knife.

In the accompanying drawing:

Figure 1 is a plan view showing the knife guiding elements in operative positions in relation to a pie or cake to be cut.

Figure 2 is a sectional view on the line 2—2 of Figure 1.

Figure 3 is an enlarged detailed sectional view on the line 3—3 of Figure 1.

Figure 4 is a side elevation, partly in section, showing the unitary assembly of the knife carrying elements as collapsed, the receptacle in which the knife carrying elements are stored and the knife carried by and projecting from the receptacle as a handle.

Figure 5 is a perspective view of one of the knife carrying elements.

The preferred form of knife guiding element is shown in detail in Figure 5. In this form, the knife guiding element, designated generally as 1, includes a pair of spaced parallel guide fingers 2 and an eye 3 by which the guide fingers are carried, the guide fingers and the eye preferably being integral and the spaces between the guide fingers being unobstructed from the outer ends of the guide fingers to the points at which the guide fingers are connected to the eye 3. The knife guiding elements 1 are provided in any suitable number, e. g. six, and are carried by and pivotally connected to a ferrule 4, preferably in the same general manner in which the ribs of an umbrella are connected to a central ferrule. Thus the ferrule 4, is formed with equidistant radially extending notches 5 into which the eyes 3 project and with an annular recess 6 to accommodate a split resilient ring 7 which extends through the eyes 3, thereby to connect the knife guiding elements to the ferrule and to provide pivots about which the knife guiding elements may swing.

The ferrule 4 is a part of the carrying element (designated generally as 8) for the knife guiding elements 1. The element 8 otherwise includes a cup-shaped part 9 within which the ferrule 4 is fitted and which is provided with radial slots 10 severally in alinement with the slots 5 and forming continuations thereof, the base of the cup-shaped part 9 limiting the extensible pivotal movement of the knife guiding elements 1 and positively maintaining them in coplanar relationship as operatively positioned. Thus, as operatively positioned, the knife guiding elements 1 extend radially in coplanar relationship from the carrying element 8 and are equidistantly mutually spaced.

The ferrule 4 and the cup-shaped part 9 are connected in unitary fashion as parts of the carrying element 8 by a central stem 11 having a co-axial extension 12 which projects beyond the cup-shaped part 9 and provides a centering pin, i. e., a pin for centering the knife guiding elements 1 with relation to the pie or cake to be cut, the extension 12 for this purpose having a rounded end 13 which may readily penetrate the pie or cake to the required extent.

The cup-shaped part 9, which for convenience may be called a cap, cooperates with a receptacle 14 which, is preferably of such general form and cross sectional outline, as to be available as the handle of a knife 15 to be used for cutting the cake or pie, the knife 15 having a shank 16 which is suitably, and preferably permanently, connected to an end of the receptacle 14. The knife guiding elements 1 are normally confined within a recess 17 formed in the receptacle 14, extending axially thereof, and open to the end of the receptacle opposite the end by which the knife is carried. At its outer end the receptacle is provided with a sleeve 18 having a projecting cylindrical portion 19.

The cap 9 normally abuts the face of the receptacle 14 at the open end thereof as a shoulder and normally has a suitable friction fit within the cylindrical portion 19. The extension 12 of the stem 11 is preferably knurled in order that it may be used as a finger piece for conveniently fitting the cap 9 in the portion 19 and for removing it from the portion 19 when the use of the knife guiding elements 1 is required.

Figures 1 and 2 show the device as positioned for use. When the cap 9 is pulled from the receptacle 14 it withdraws the knife guiding elements 1 from the recess 17 and when the elements 1 are clear of the recess 17, the cap 9 being held in the position shown in Figure 4 wherein the elements 1 are located above the base of the cap, these elements will drop by gravity to horizontal positions in which they project radially from the cap 9 and are supported in common plane. Using the upwardly projecting portion of the stem 11 as a finger piece the extension 12 is thereupon pushed into the pie or cake at its center to an extent sufficient to bring the lower face of the cap into contact with the surface of the pie or cake, the knife guiding elements 1 being supported above and out of contact with the surface of the pie or cake as shown in Figure 2. This has the advantages of preventing the elements 1 from marring the frosting or meringue or the like and also of keeping them clean. The knife 15 is then inserted between the fingers 2 of one of the guide elements and a kerf is cut in the pie or cake, the cutting being outward from a central zone. This operation is repeated in the case of the remaining guide fingers whereby the pie or cake will be divided into slices of equal extent. Thereupon again using the stem 11 as a finger piece of the device is withdrawn from the pie or cake and the cap 9 is inverted whereby the elements 1, now positioned below the base of the cap, will fall by gravity into substantially parallel relation. The elements 1 are then introduced into the recess 17 of the receptacle 14 and the cap 9 is pushed home, that is to say in abutting relation to the end face of the receptacle in which relation it serves as a closure for the receptacle and is frictionally held by the projection 19 until the use of the device is again required. Any food particles adhering to the outer face of the base of the cap may be conveniently wiped away. The inner or base walls of the notches 5 cooperate as shoulders with adjacent straight portions of the eyes 3 in order to limit the collapsing movements of the elements 1 to positions in which these elements are substantially parallel, thereby to prevent them from interfering with one another when their extension is required for the purpose of use.

When, after its use, the device is removed from the pie or cake as above described, the kerfs formed by the knife 15 are continued by means of the knife through the central zone previously occupied by the cap 9 until they meet the central opening formed by the projection 12, whereupon the several slices may be individually removed and served.

I claim:

1. In a knife guide for cooperation with a knife in the cutting of pies or cakes into slices, in combination, a plurality of knife guiding elements, a carrier element common to the knife guiding elements, and means connecting the knife guiding elements to the carrier element and providing pivots about which the knife guiding elements may swing, the knife guiding elements having operative positions and collapsed positions, the carrier element determining the operative positions of the knife guiding elements and in such positions supporting them in radially projecting relation in a common plane and in spaced relation to the upper surface of the pie or cake, the knife guiding elements in their collapsed positions projecting from the carrier element as a support in substantially parallel relation to one another.

2. A knife guide as set forth in claim 1 wherein the carrier element is provided with a centrally located axial extending projection which constitutes a centering pin and is formed for insertion in the pie or cake to be cut.

3. A knife guide as set forth in claim 1 wherein the carrier element is provided with a centrally located axial projection which constitutes a centering pin and is formed for insertion in the pie or cake to be cut and with a centrally located axial stem extending in the opposite direction from said projection and available as a finger piece by means of which the projection may be inserted into or withdrawn from the pie or cake to be cut.

4. In a knife guide for cooperation with a knife in the cutting of pies or cakes into slices, in combination, a plurality of knife guiding elements, a carrier element common to the knife guiding elements, means connecting the knife guiding elements to the carrier element and providing pivots about which the knife guiding elements may swing, the knife guiding elements having operating positions and collapsed positions, the carrier element determining the operative positions of the knife guiding elements and in such positions supporting them in radially projecting relation in a common plane and in spaced relation to the upper surface of the pie or cake, the knife guiding elements in their collapsed positions projecting from the carrier element as a support in substantially parallel relation to one another, a receptacle having an axially extending recess open to one end thereof and serving to receive the knife guiding elements in their collapsed positions, and means for effecting the detachable connection of the carrier element and the receptacle and for holding the carrier element in a position normally to close the open end of the said recess.

5. A knife guide as set forth in claim 4 wherein the carrier element includes a ferrule to which the knife guiding elements are pivotally connected and a cup-shaped part connected to the ferrule and within which the ferrule is mounted, the cup-shaped part having slots to accommodate the knife guiding elements and directly cooperating with the means for effecting the detachable connection of the carrier element and the receptacle, the cup-shaped part providing a cap which normally closes the open end of the recess.

6. A knife guide as set forth in claim 4 wherein the carrier element is provided with a centrally located axially extending projection which constitutes a centering pin and is formed for insertion in the pie or cake to be cut.

7. A knife guide as set forth in claim 4 wherein the carrier element is provided with a centrally located axial projection which constitutes a centering pin and is formed for insertion in the pie or cake to be cut and with a centrally located axial stem extending in the opposite direction from said projection and available as a finger piece by means of which the projection may be inserted into or withdrawn from the pie or cake to be cut.

8. A knife guide as set forth in claim 4 wherein the carrying element includes a ferrule to which the knife guiding elements are pivotally connected, a cup-shaped part having slots to accommodate the knife guiding elements and directly cooperating with the means for effecting the detachable connection of the carrier element and the receptacle, the cup-shaped part providing a cap which normally closes the open end of the recess, and a centrally located stem connects the ferrule and the cup-shaped part and is provided with a projection which constitutes a centering pin and is formed for insertion in the pie or cake to be cut, the stem projecting beyond the carrying element and its projecting portion being available as a finger piece by means of which the projection may be inserted into or withdrawn from the pie or cake to be cut.

THOMAS D. DI ADDARIO.

No references cited.